April 28, 1964   A. J. ANTONIOUS   3,130,823
EXPANDABLE ARTICLE STORAGE CASE
Filed Oct. 20, 1961   5 Sheets-Sheet 1

Anthony J. Antonious
INVENTOR

ATTORNEYS

April 28, 1964   A. J. ANTONIOUS   3,130,823
EXPANDABLE ARTICLE STORAGE CASE
Filed Oct. 20, 1961   5 Sheets-Sheet 2

Anthony J. Antonious
INVENTOR

BY Sughrue, Rothwell, Mion & Zinn
ATTORNEYS

April 28, 1964  A. J. ANTONIOUS  3,130,823
EXPANDABLE ARTICLE STORAGE CASE
Filed Oct. 20, 1961  5 Sheets-Sheet 3

Anthony J. Antonious
INVENTOR

BY *Sughrue, Rothwell, Mion & Zinn*
ATTORNEYS

April 28, 1964  A. J. ANTONIOUS  3,130,823
EXPANDABLE ARTICLE STORAGE CASE
Filed Oct. 20, 1961  5 Sheets-Sheet 4

Anthony J. Antonious
INVENTOR

BY *Sughrue Rothwell Mion & Zinn*
ATTORNEYS

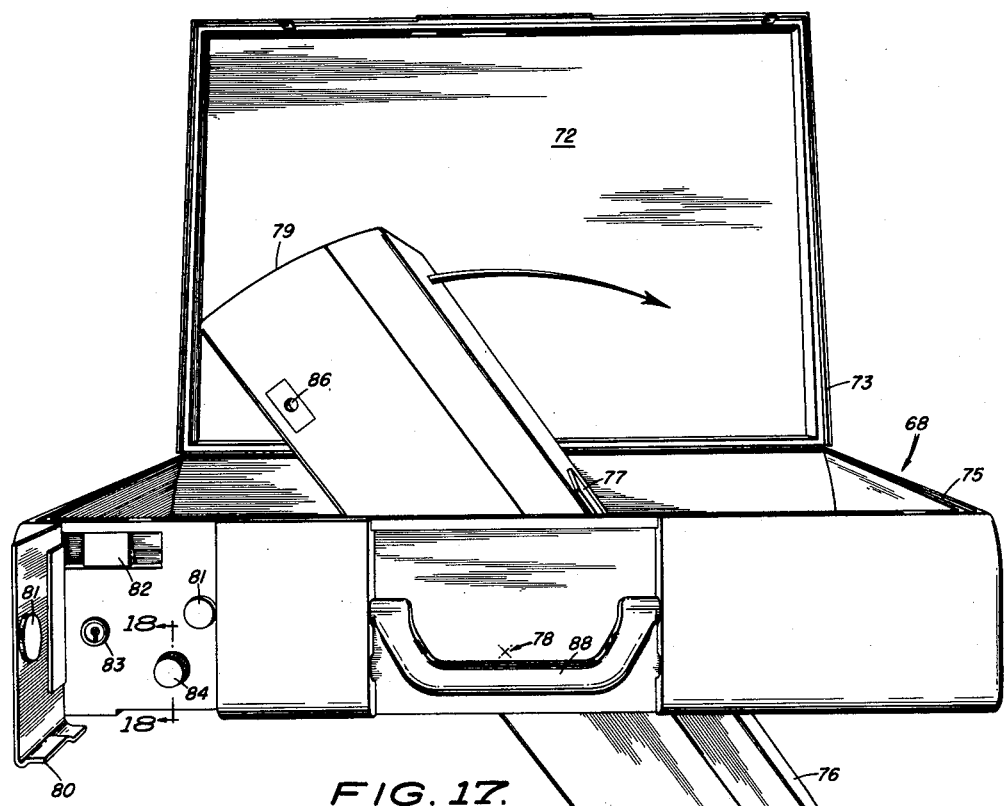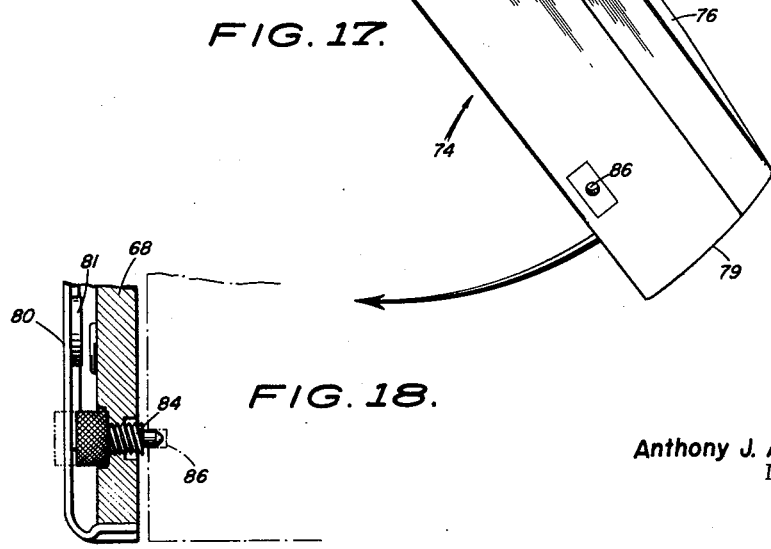

United States Patent Office 3,130,823
Patented Apr. 28, 1964

3,130,823
EXPANDABLE ARTICLE STORAGE CASE
Anthony J. Antonious, 3608 Cedar Drive,
Baltimore 7, Md.
Filed Oct. 20, 1961, Ser. No. 146,617
10 Claims. (Cl. 190—44)

This invention relates to improvements in cases for carrying and storing articles. More particularly, the invention relates to a case convertible in size and storage space by manipulation of an enclosed receptacle within an outer frame of the case. This application is a continuation-in-part of my prior copending application, Serial No. 96,466, filed March 17, 1961, for "Expandable and Multipurpose Article Storage Case," now abandoned.

Although the multipurpose article storage case of this invention is illustrated and described in one embodiment as a convertible vanity case or the like, and in another embodiment as a convertible luggage-attache case, it will be evident that it may be utilized to store and carry a number of other articles of suitable size to be contained therein. For example, the case could be adapted for use as a jewelry case, school kit, fishing kit, razor case, pill and coin case, travel bit, manicure and polish kit, a makeup kit, a sewing kit, a speciality tool kit, a clothes hamper or a kit, carton or case for a multitude of other articles.

The known prior art on article storage and carrying cases is well developed and much effort has been directed toward various facets of this art including different hinging arrangements and the like to provide storage and access for various articles. However, there is a definite need for a convertible storage case which can be manipulated to provide additional internal storage space within the case at the will of the user.

This invention provides a multipurpose article storage case having an outer frame and a hinge cover and containing within the outer frame a reversible receptacle for providing a compact case without internal storage space and also being convertible and expansible by eccentric pivotal movement of the receptacle to an opposite position to provide extra internal storage space. Furthermore, the article carrying receptacle in the case is itself openable and may be convertible to provide access to various compartments therein. Also, in the embodiment of the case as a luggage-attache case, a unique two-position handle may be provided for the case in either its expanded or compact condition and a more locking and closing arrangement is provided.

Other advantages of this invention and objects thereof will be apparent from consideration of the following description and claims taken in connection with the accompanying drawings which disclose, by way of example, the principles of this invention and the best mode which has been contemplated of applying these principles.

Figure 1:
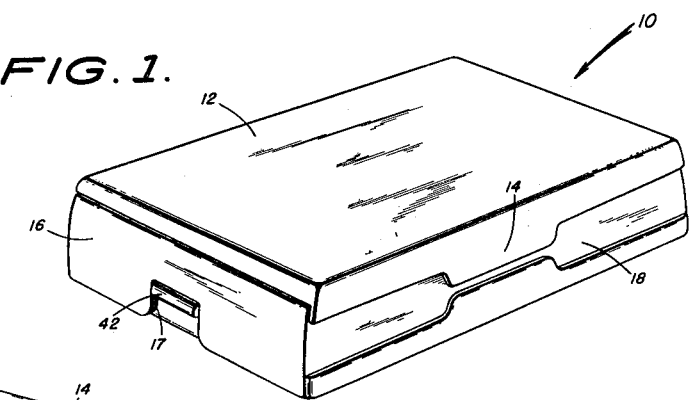
FIG. 1 is a perspective view of the case of this invention in its most compact condition.
Figure 2:
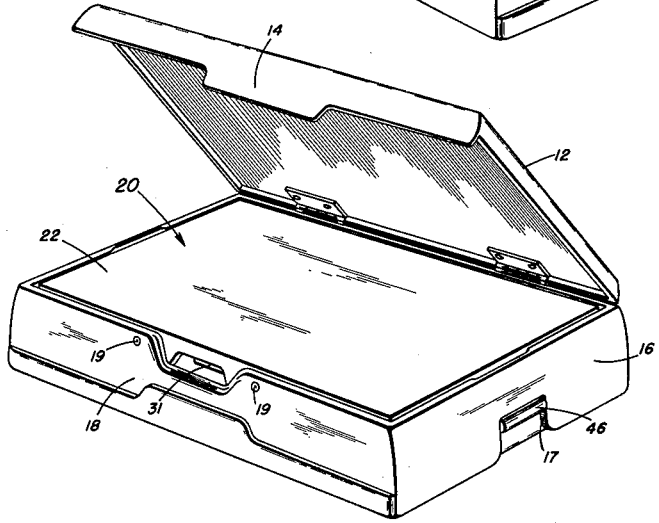
FIG. 2 is a perspective view of the case shown in FIG. 1 with the cover lifted showing a separately closable receptacle therein.

FIG. 17 is a front perspective elevation view illustrating the pivotal movement of the inner receptacle within the outer frame for converting the luggage-attache case from compact to expansible condition and vice-versa and also illustrating the control panel and control panel cover as well as the two position handle in its flat position; and FIG. 18 is an enlarged sectional view taken along line 18—18 of FIG. 17 and showing the lock for holding the inner receptacle in either of its two positions.

In general, and in both embodiments, this invention contemplates an article storage case which is convertible from one size, shape and capacity to another. The article storage case includes an outer frame having rigid side walls of the same height throughout and a hinged top cover. The outer frame is bottomless and in the space enclosed by the side walls of the hollow outer frame an inner receptacle member is pivotally connected to the outer frame for at least 180° movement therein. The pivotal connections of the inner receptacle member and the sides of the outer frame are equidistant from their ends but not equal distance from the top and bottom of the outer frame sides and inner receptacle top and bottom, so that when the inner receptacle pivots within the outer frame, it may in one position, with its top or bottom parallel to the top or bottom of the outer frame define a compact storage case while at a 180° opposite flipped-over condition may define a space between the bottom of the inner receptacle, now facing up, and the hinged cover of the outer frame. Also in this position, the top of the inner receptacle, now facing down, extends beyond the outer frame and creates a larger size case.

Referring to the drawings, in the embodiment of FIGS. 1–12, an article storage case 10 includes a hinged cover 12 provided with a cover flange finger grip 14. The cover 12 is hingedly connected to an outer frame base 16 which is open at the top and bottom and has suitable slots 17 in the opposite ends thereof. A front panel 18 of the outer frame base 16 includes latch protrusions 19 for cooperating with depressions on the underside of cover flange finger grip 14 for the purpose of latching the cover in a closed position when desired.

Figure 7:
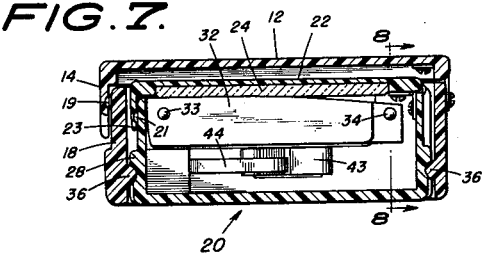
FIG. 7 is a sectional view taken through the case and inner receptable with the covers closed showing the pivot and latch arrangement.

A separately closable multicompartment receptacle 20 is provided within the outer base frame 16 and this receptacle includes a hinged cover 22 which has a divided cover flange 23 providing a finger grip therebetween and is latched to the receptacle 20 by means of latch protrusions 21, FIG. 7, on the front side of the case 20 cooperating with depressions in the inside of flanges 23.

Figure 3:
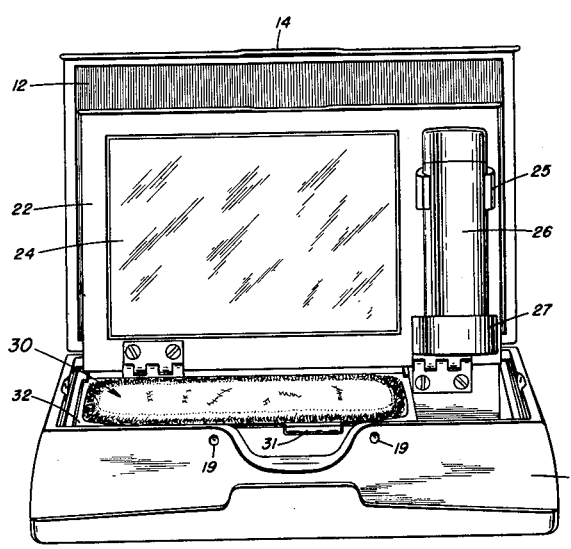
FIG. 3 is a front perspective of the case with the separately closable receptacle cover also raised for a view of the inside of the separately closable receptacle.
Figure 4:
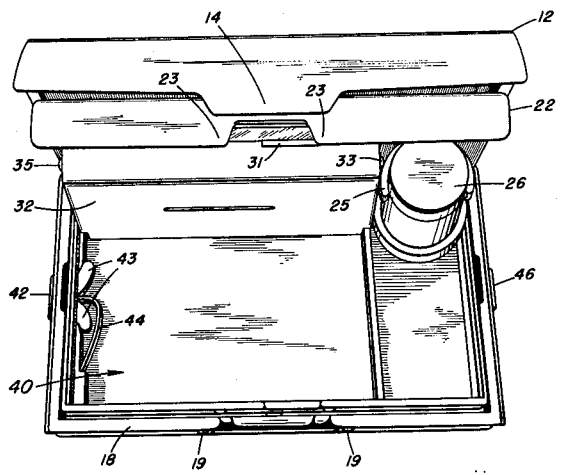
FIG. 4 is a top perspective view of the case and inner closable receptacle both with the hinged covers thereof opened, showing a latch for the inner receptacle and an additional storage compartment within the inner receptacle.
Figure 8:
FIG. 8 is a partial sectional view taken along lines 8—8 of FIG. 7.

As shown in FIG. 3, the underside of hinge cover 22 contains a mirror 24 in the illustrated embodiment wherein the case is utilized as a convertible vanity. A lipstick container 26 may be held to the underside of lid 22 by means of a grip 25 and a retainer socket 27. Within the body of the receptacle 20 another pivoted tray 30 is provided. Tray 30 includes a frame 32 having a depression therein for containing powder and a powder puff as illustrated in FIG. 3 and is provided with a small edge flange 31 for the purpose of gripping the tray 30 and pivoting it upwards. A latch 33 of the ball protrusion and socket depression type is provided on the end of tray 30 and cooperates with the grip 25 so that the frame 32 of tray 30 may be locked to the underside of hinge lid 22 as illustrated in FIG. 4. The space under the tray 32 on the bottom 40 of the container 20 may also be utilized as a secret compartment for containing money or the like. The frame 32 of tray 30 is pivoted in the receptacle 20 by means of pivot bearings 34 as illustrated in FIGS. 7 and 8. The tray 30 may be latched by latch protrusion 35 cooperating with a depression in the inside wall of container 20 for the purpose of latching the tray in the FIG. 3 position.

Figure 9:
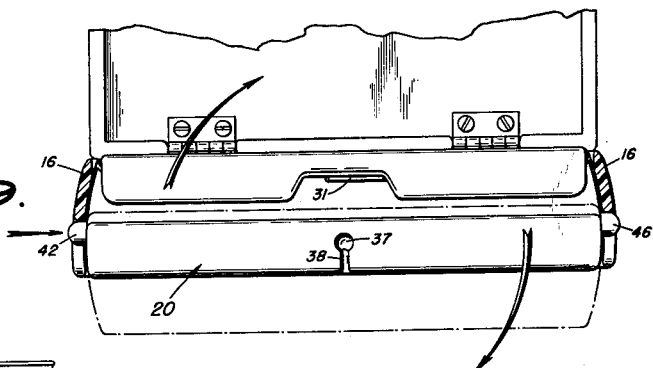
FIG. 9 is a front elevation view, partially in section, illustrating the pivotal movement of the inner receptacle for converting the case.
Figure 12:
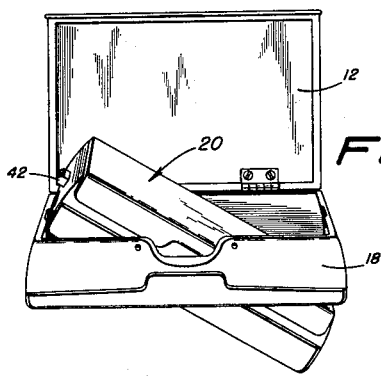
FIG. 12 is a front perspective view of the inner receptacle in pivoting position.

The entire receptacle 20 is pivotable within the frame 16 to convert the case from a compact-type case with double hinged lids on an inner receptacle to a storage-type case providing extra storage space. This conversion is accomplished by pivoting the inner receptacle 20 within the frame 16 about pivot bearings formed from protrusions 36 on the inside of the frame 16 cooperating with depressions 37 on the outside of receptacle 20. A channel 38 leads into depression 37 for the purpose of assembly and disassembly as shown in FIG. 9. Of course, any other type of suitable bearing may be utilized. As is evident from the drawings, the pivot point formed by protrusion 36 and depression 37 is midway between the end walls of frame 16, but is closer to the bottom than to the top of front wall 18 of the frame 16. Thus, when pivoting about the pivot point, the tray may move from the full line position to the phantom line position as illustrated in FIG. 9.

In order to enable the conversion of the case by means of pivoting the receptacle 20, a push button 42 is provided in the side of the receptacle 20. The push button contains inner ears 43 guiding a biasing spring 44. The opposite end of container 20 has a similar shaped but rigid step 46. For the operation of converting the receptacle, the push button 42 must be pushed in and the inner receptacle 20 is pivoted so that the side with the push button moves upwardly and through 180° until the stop 46 cooperates with a slot 17 in the frame 16.

Figure 6:
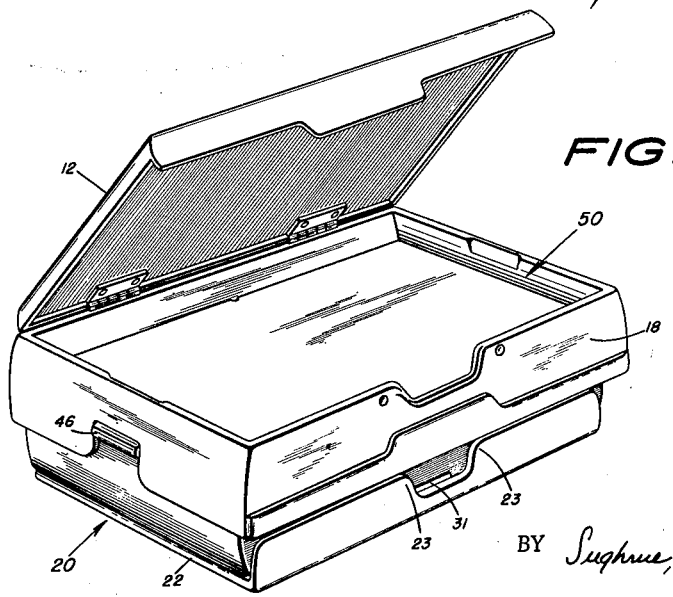
FIG. 6 is a perspective view illustrating the case with the outer lid open and the inner receptacle pivoted to provide an extra storage space within the case.

As shown in FIG. 6, when the receptacle is pivoted from the position illustrated in FIGS. 1, 2, 3 and 4, an extra storage space or tray 50 is provided beneath the hinged cover 12. At the same time, the remaining portion of the case may be utilized by turning the case upside down. If it is not desired to utilize the extra space provided by tray 50, the push button 42 is depressed and the inner receptacle 20 is pivoted 180° to the FIG. 2 position.

Figure 5:
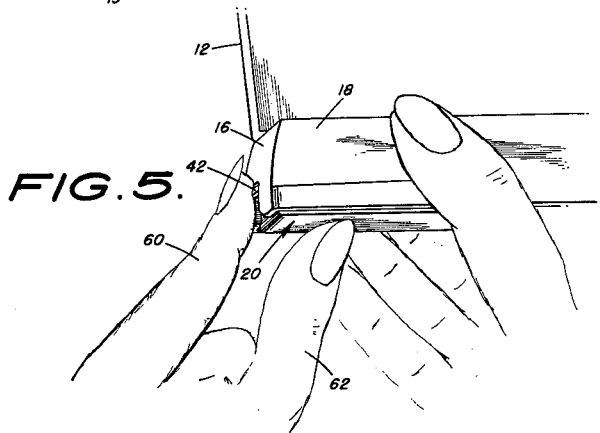
FIG. 5 is a perspective view of a portion of the case showing the manner in which the latch for the inner closable receptacle may be manipulated for converting the case.
Figure 10:
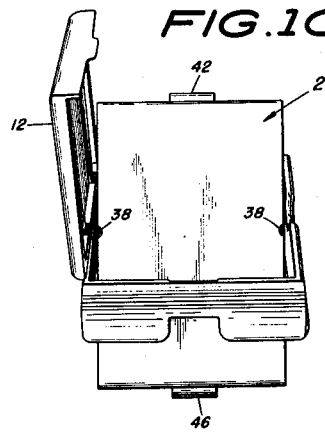
FIG. 10 is a perspective view of the case with the inner receptacle being pivoted about internal pivots for the purposes of converting from one shape and storage-type receptacle to another.

FIGS. 5, 9 and 10 illustrate the manner of accomplishing the conversion from a compact case to an expaned case. The case may be held in one hand supported on a thumb 62 with a forefinger 60 pressing inwardly on the push button 42. As the push button is pushed inwardly far enough to clear the inside wall of frame 16, the receptacle 20 may be pivoted in the direction of the arrows shown in FIG. 9. With the cover 12 open as shown in FIG. 10, the receptacle 20 may continue its pivoting movement for 180° to convert the case from one shape and capacity to another shape, capacity and arrangement.

Figure 11:
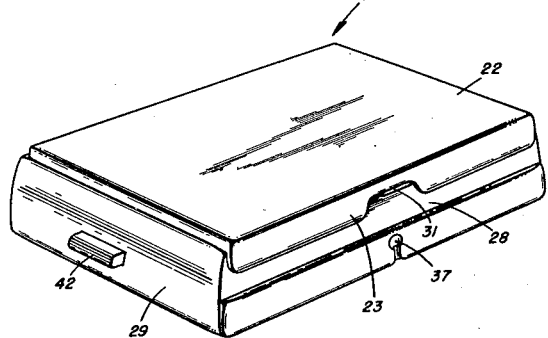
FIG. 11 is a perspective view of the inner separate closable receptacle per se.

As shown in FIG. 11, the inner receptacle 20, which is a compact itself may be detached from the frame 16 for separate use.

Figure 13:
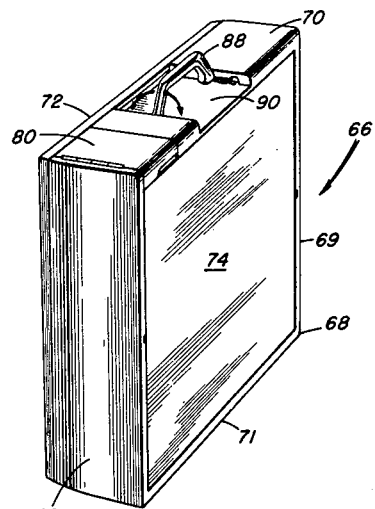
FIG. 13 is a perspective view of the modification of this invention wherein the case is a luggage-attache case and in FIG. 13 the case is in its compact or attache case condition.
Figure 14:
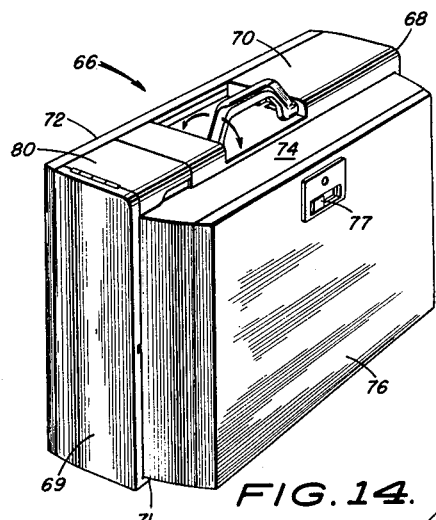
FIG. 14 is a perspective view of the luggage-attache case shown in FIG. 14, while in its expanded position for providing additional storage space.
Figure 15:
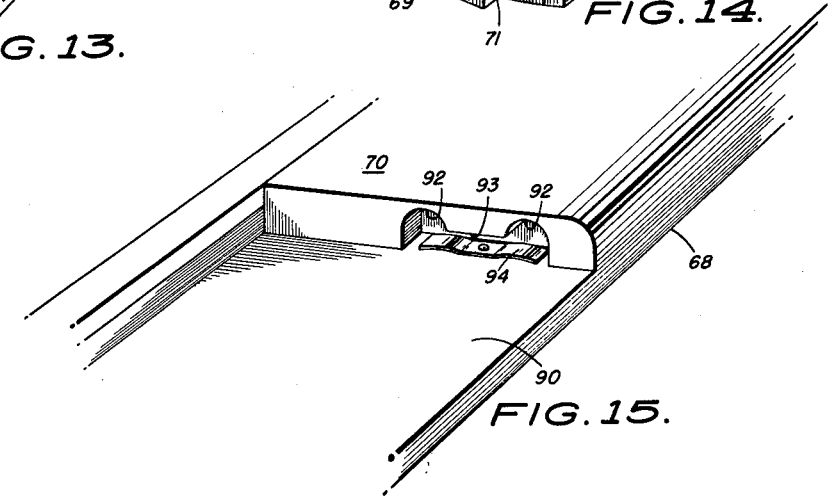
FIG. 15 is an enlarged perspective view of a handle socket arrangement for holding and providing two positions for the handle of the luggage-attache case shown in FIGS. 13 and 14.
Figure 16:
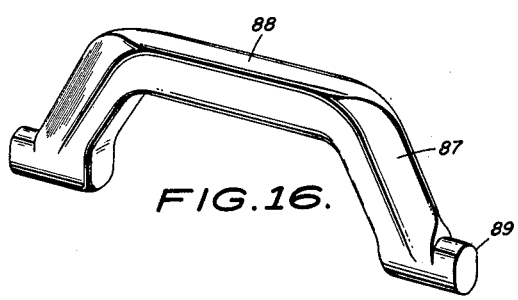
FIG. 16 is a perspective view of the handle used with the luggage-attache case and adapted to be inserted in the handle socket of FIG. 15.

FIGS. 13 and 14 show another embodiment of the invention as a luggage-attache case. In FIG. 13, the case is in its compact position, while in FIG. 14, an inner receptacle has been rotated about a pivot point located as discussed in regard with the first embodiment to provide an expanded luggage case with additional storage space.

The expandable luggage-attache case 66 shown in FIGS. 13–18 includes an open bottomed, rectangular frame 68. This frame includes end walls 69 rigidly connected with a front wall 70 and a rear wall 71. The frame is also provided with a hinged cover 72 which constitutes the cover for the case. The cover may be locked to the case by suitable concealed lock means as will be described.

An inner receptacle 74 is carried within the frame 68 and is pivotally connected thereto in the same manner as described for the embodiment of the convertible vanity case in FIGS. 1–12. That is, pivot points 78 are located equidistant from the ends 69—69 of the outer frame and equidistant from the ends of the inner receptacle 74. However, the pivot points 78 are closer to the bottom of the front and rear walls 70 and 71 of the frame 68 than they are to the top while also being similarly eccentric with regard to the top and bottom of the inner receptacle 74. As is apparent, this arrangement of the pivot points allows the case to be converted from a compact case to an expanded case with additional storage space.

The inner receptacle 74 also includes a hinged cover 76 with a suitable slide actuated lock fastener 77 for locking the hinged cover to the remainder of the inner receptacle. In the compact condition of the case as shown in FIG. 13, the cover 76 is enclosed within the cover 72 of the outer frame while in the expanded condition with the inner receptacle 74 flipped over 180° about its pivot points 78, the cover 76 and lock fasteners 77 are exposed. For this reason, it is also desirable to incorporate a key locking means in the lock 77.

The ends 78 of the inner receptacle 74 are slightly curved on a suitable radius to allow the receptacle to eccentrically pivot within the outer frame 68, as the inner receptacle 74 is as long as the inside of the outer frame in the embodiment illustrated.

A control panel cover 80 is normally closed as shown in FIGS. 13 and 14 to allow the case to have a very compact appearance. The cover 80 is hinged to the front wall 70 of the frame and is normally held closed by magnets 81. The cover 72 may be locked to the frame 68 by a slide lock including a slide controlling button 82 and may be locked in place by a key lock actuated through keyhole 83.

Lower edges 73 of cover 72 and top edges 75 of rectangular frame 68 contain mating magnetized surfaces for forming a tongue in groove joint. Similar mating magnetized tongue in groove contact surfaces are provided between the top edges of the inner receptacle 74 and its cover 76. These magnetized tongue in groove joints will prevent the covers 72 and 76 from accidentally opening and the contents spilling, such as when the luggage case is picked up and the latches for the covers are not locked.

A lazy screw detent 84 as shown in detail in FIG. 18 includes a knurled knob or head and a multi-lead screw for quick actuation for causing the end of the screw to plunge into either one of a pair of sockets 86 in the inner receptacle 74. Of course other well known types of detents could be used.

The case is provided with a unique two position handle including a handle member 88 with inclined beveled side edges 87 and holding tips 89 which are oval shaped in section. The handle is adapted to lie flat in either one of its two positions in a handle depression 90 formed in the front wall 70 of the frame 68. With the handle flat a surface with no projections is provided across the front wall 70 of the frame. The handle may move to its flat position within the depression 90 if anything strikes the edge of the handle, for example along inclined bevel 87 and forces the handle down. The handle in this condition will remain flat until picked up again at the time the case is picked up. This arrangement prevents the handle from being readily broken off.

The handle 88 is secured to the case by virtue of the tips 89 extending within two position connected socket 92 having a double leaf spring 94 mounted in the bottom thereof. In normal carrying condition, the long end of the oval tip 89 will be in one of the large depressions in the double socket 92 and will be held therein by spring 94. If it is desired to shift the position of the handle, for example, when the case is converted from its compact to expanded condition, it is merely necessary to allow the handle to assume a flat position in recess 90 so that the narrow side of the oval may travel from one of the sockets to the other through the narrow connected passage 93. However, passage 93 is of such a height that the long end of the oval will not go through it.

The two sockets 92 for the two position handle are positioned such that the case will be balanced with the handle in one socket when the case is in its compact position of FIG. 13 and will be balanced with the handle in the other socket as shown in FIG. 14, with the case in its expanded condition.

As is evident from the foregoing, there is disclosed two unique embodiments of an expandable article storage and carrying case, the common features of which include the fact that a rigid bottomless outer frame with a hinged cover is provided with an inner receptacle member, itself having a hinged cover and being pivoted to the outer frame so that in one position a case of one size and capacity is formed and in another position a case of another size and capacity is formed. With the expandable case used as a luggage carrier, for example, the attache case arrangement as shown in FIG. 13 may be used at the start of a journey with clean clothes stored in the inner receptacle and possibly papers stored in the small space on the top thereof between this top and the cover. At the end of the journey with innumerable dirty clothes and possibly additional papers, the case may be expanded into a larger size luggage case and will assume the size and shape as shown in FIG. 14. The additional extra space under the cover lid 72 between this cover lid and the surface of the inner receptacle 74 may be used for storing additional dirty clothes or any other suitable articles.

The outer frames of the cases shown have a rectangular shape as do the inner receptacles. However, the shape of the outer frame and inner receptacle may also be oval, circular, elliptical, polygonal or of any other symmetrical design. A combination of such shapes may also be used whereby the inner receptacle may be a different shape and design from the outside of the outer frame.

While the above description and drawings disclose the fundamental novel features of the invention as applied to a preferred embodiment, it will be understood that various omissions, substitutions and changes in the form and details of the device illustrated and in its operation may be made by those skilled in the art without departing from the spirit of the invention. It is intended therefore to be limited only as indicated by the scope of the following claims.

What is claimed is:

1. A storage case such as a vanity, luggage-attache case or the like, convertible from one size, shape and capacity to another, the case comprising;
   (a) an outer frame with upstanding side walls enclosing the sides of a receptacle space, the outer frame being open across its top and bottom,
   (b) an inner enclosed receptacle in the receptacle space,
   (c) eccentric pivotal connecting means on the outer frame, the connecting means being equidistant from the extremities of the frame but unequidistant from the top and bottom of the frame sides,
   (d) eccentric pivotal connecting means on the inner receptacle cooperating with the eccentric pivotal connecting means on the outer frame to pivotally support the receptacle within the outer frame eccentrically, the eccentric pivotal connecting means on the inner receptacle being equidistant from the extremities of the receptacle but unequidistant from the top and bottom of the receptacle,
   (e) an openable cover member for the top of the outer frame, and
   (f) stop means cooperating between the outer frame and inner receptacle to stop the inner receptacle for pivotal movements of 180° so that when the inner receptacle eccentrically pivots in the frame through 180° the space defined between the top of the inner receptacle and the openable cover member is variable in size, shape and capacity.

2. A case as defined in claim 1 wherein the inner receptacle in one of the pivotal positions is substantially flush with the top and bottom of the outer frame and when pivoted through 180° to the opposite position the space between the openable cover member and the top of the inner receptacle creates an expansible storage area.

3. A case as defined in claim 2 wherein the ends of the inner receptacle not containing the pivotal connecting means and the insides of the frame are cylindrically curved to allow for the eccentric pivotal movement of the inner receptacle within the frame.

4. A case as defined in claim 3 wherein the inner enclosed receptacle is provided with a hinged cover member and a hinged inner tray, the cover member including means for carrying articles and the inner tray including means for latching it either onto the hinge cover or onto the inner receptacle so that the case may be used as a vanity.

5. A vanity case as defined in claim 4 wherein the inner receptacle and outer frame pivotal connecting means are disconnectable so that the inner receptacle may be completely removed from the outer frame member and used by itself.

6. A vanity case as defined in claim 5 further comprising means defining a secret compartment in the inner receptacle below the hinged inner tray.

7. A luggage-attache case as defined in claim 2 further comprising a handle attached to one side of the frame for carrying the case, the handle movably supported to assume either one of two separate positions which positions are determined by cooperating means on the frame so that the receptacle with regard to either of the two handle positions may be balanced for one position of the handle with the case in one condition and for another position of the handle with the case pivoted 180° and in the other condition.

8. A luggage-attache case as defined in claim 7 wherein the handle is movable to a position flat against the side of the frame and wherein the frame includes a depression for holding the handle so folded in inoperative position.

9. A luggage-attache case as defined in claim 8 further comprising latch means for latching the inner receptacle in its two positions providing an expanded or a compact case and further latch means for securing the hinged cover to the outer frame member, the actuators for both of said latch means being within a control panel within a front side of the frame, and a hinged cover for the control panel normally held closed by magnetic means and normally covering the actuators for both of said latch means.

10. A luggage-attache case as defined in claim 9 further comprising magnetized tongue-in-groove mating surfaces between the hinged cover and outer frame and between the hinge top and inner receptacle to prevent accidental opening of the cover and top.

References Cited in the file of this patent

UNITED STATES PATENTS

| | | |
|---|---|---|
| 1,866,162 | Hall | July 5, 1932 |
| 2,138,190 | Myers | Nov. 29, 1938 |
| 2,603,549 | Tessmer et al. | July 15, 1952 |

FOREIGN PATENTS

| | | |
|---|---|---|
| 276,982 | Italy | Aug. 25, 1930 |